United States Patent

Carter et al.

[11] Patent Number: 5,271,234
[45] Date of Patent: Dec. 21, 1993

[54] APPARATUS FOR AND METHOD OF REMOVING TILE FROM A FLOOR

[75] Inventors: David L. Carter, 2416 S. 12th St., St. Louis, Mo. 63104; James B. Simms, Wood River, Ill.

[73] Assignee: David L. Carter, St. Louis, Mo.

[21] Appl. No.: 993,361

[22] Filed: Dec. 18, 1992

[51] Int. Cl.⁵ .................. F25D 17/02; F25D 25/00; F25D 3/00; B08B 7/02
[52] U.S. Cl. .................................... 62/64; 62/62; 62/293; 241/DIG. 37; 134/17
[58] Field of Search .............. 62/64, 62, 533, 384, 62/293; 134/17; 225/93.5; 241/DIG. 37

[56] References Cited

U.S. PATENT DOCUMENTS

| | | | |
|---|---|---|---|
| 2,421,753 | 6/1947 | Joyce | 62/293 X |
| 3,043,200 | 7/1962 | Huttash | 134/17 |
| 3,674,031 | 7/1972 | Weiche | 62/293 X |
| 3,676,963 | 7/1972 | Rice et al. | 51/320 |
| 4,043,140 | 8/1977 | Wendt et al. | 62/533 X |
| 4,112,706 | 9/1978 | Brister | 62/293 X |
| 4,129,431 | 12/1978 | Ross et al. | 62/533 X |
| 4,274,576 | 6/1981 | Shariff | 225/93.5 X |
| 4,491,484 | 1/1985 | Williams | 241/DIG. 37 |
| 4,554,025 | 11/1985 | Burke et al. | 134/17 |
| 4,692,982 | 9/1987 | Rice | 241/DIG. 37 |
| 4,866,105 | 9/1989 | Batdorf | 523/103 |
| 4,956,042 | 9/1990 | Hubert et al. | 156/344 |
| 4,963,205 | 10/1990 | Hubert | 156/80 |
| 5,025,632 | 6/1991 | Spritzer | 62/64 |
| 5,034,247 | 7/1991 | Batdorf | 427/221 |
| 5,091,034 | 2/1992 | Hubert | 62/62 X |
| 5,179,840 | 1/1993 | Worsfold | 62/64 |

Primary Examiner—Henry A. Bennett
Assistant Examiner—Christopher B. Kilner
Attorney, Agent, or Firm—Senniger, Powers, Leavitt & Roedel

[57] ABSTRACT

A method for removing tile adhered by a substance to a floor includes the step of enclosing a volume generally above an area of the floor and tile, with the tile and floor defining the bottom of the volume enclosed. The temperature in the volume enclosed is reduced so that the substance adhering the tile to the floor becomes embrittled. The apparatus is maintained in position over the area of the floor for a predetermined time to produce the required embrittlement of the adhering substance, and then moved to expose the area of the floor previously below the volume enclosed. The tile is then removed from the floor. An apparatus for use in the method is also disclosed.

19 Claims, 2 Drawing Sheets

APPARATUS FOR AND METHOD OF REMOVING TILE FROM A FLOOR

BRIEF SUMMARY OF THE INVENTION

This invention relates generally to an apparatus and method for removing floor tiles and, more particularly to an apparatus and method for removing tiles by freezing.

Asbestos floor tile, which was installed in the past in numerous buildings to meet fire codes is now being removed to abate the potential health hazard caused by asbestos. There are several methods for removing tile from a floor. The most common method is that of physically breaking the bond between the tile and the floor with a long handled spatula like device. The spatula is wedged between the tile and floor to break the bond with the floor. In situations where the mastic or adhering substance is aggressively adhering the tiles to the floor, manual removal with spatulas requires a number of laborers working for a substantial amount of time to complete the job. Moreover, the tiles tend to be broken as they are removed, creating asbestos dust which is hazardous to the laborers. Another method for removing the tiles is to apply extreme heat to the tiles to loosen the mastic adhering the tile to the floor. The heat creates a very hot working environment for the laborer, and often makes the tiles difficult to handle. In addition, where electricity is the power source for generating the heat, a long umbilical cord is required to connect the tile removing apparatus to the power source.

Thus, there is presently a need for an apparatus and method for removing floor tile which can be carried out quickly and with minimal breakage of the tiles.

Among the several objects of this invention may be noted the provision of an improved method and apparatus for removing tile from a floor which removes the tile without breakage thereof; the provision of such a method which requires fewer laborers to carry out; the provision of such a method and apparatus which is relatively inexpensive; the provision of such apparatus which is mobile and free of umbilical connection to a remote energy source; the provision of such a method and apparatus which removes tile from a floor quickly with little physical effort on the part of the operator; and the provision of such a method and apparatus which is easy to operate.

Generally, a method of the present invention for removing tile adhered by a substance such as a mastic to a floor comprises enclosing a volume generally above an area of the floor and tile, with the tile and floor defining a bottom wall of the volume enclosed. The temperature in the volume enclosed is reduced such that the substance adhering the tile to the floor becomes embrittled. The apparatus is maintained in position over the area of the floor for a predetermined time to produce the required embrittlement of the adhering substance. The apparatus is moved to expose the area of the floor previously below the volume enclosed, and then, the tile is removed from the floor.

Generally, apparatus constructed according to the principles of the present invention comprises containment means for enclosing a volume above an area of the tile and floor, with the floor and tile defining a bottom wall of the volume enclosed. The containment means has spaced apart front and rear walls, spaced apart side walls, a top wall and an open bottom. Cryogen means is adapted to be disposed in the volume for absorbing heat from the substance adhering the tile to the floor. The cryogen means is capable of absorbing sufficient heat to embrittle the adhering substance. Means is provided for moving the containment means away from the area of the floor and tile enclosed for exposing the area and allow removal of the tile from the floor.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
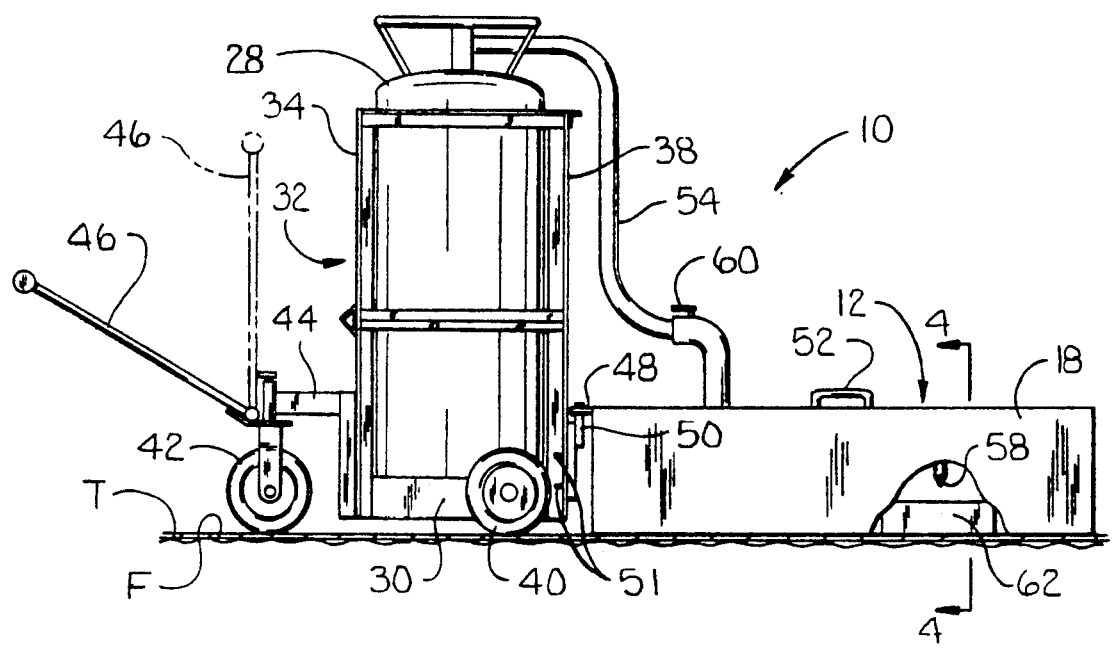
FIG. 1 is a side elevation of apparatus of the present invention.
Figure 4:
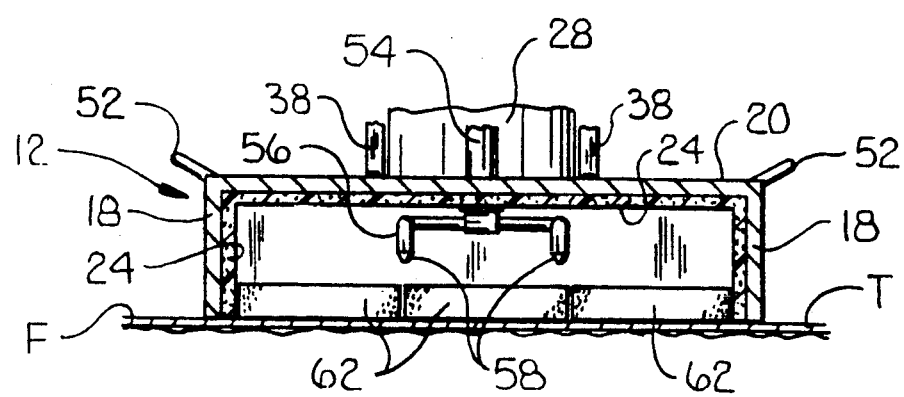
FIG. 4 is a cross section of the containment means taken along line 4—4 of FIG. 1.

Referring now to the drawings, and particularly to FIG. 1, apparatus constructed according to the principles of this invention for removing tile T from a floor F is indicated generally at 10. The apparatus includes a generally horizontal extending enclosure (broadly "containment means") indicated generally at 12 and having a front wall 14, a rear wall 16, laterally opposing sides walls 18, a top wall 20 and an open bottom 22. The tile T and floor F define the bottom wall of the volume which is enclosed by the enclosure 12. As shown in FIG. 4, panels 24 of insulation are mounted on the interior of the walls 14, 16, 18 and 20 of the enclosure 12 to retard head exchange from with the enclosure.

A cryogen is adapted to be disposed in the volume enclosed by the enclosure 12 for absorbing heat from the mastic adhering the tile to the floor. The cryogen is capable of absorbing sufficient heat at a sufficient rate to embrittle the mastic. In the preferred embodiment, the cryogen is liquid nitrogen. A combination of liquid nitrogen and dry ice has also been used, as well as dry ice alone. It is to be understood that the cryogen employed may be other than those described herein and still fall within the scope of the present invention.

Figure 3:
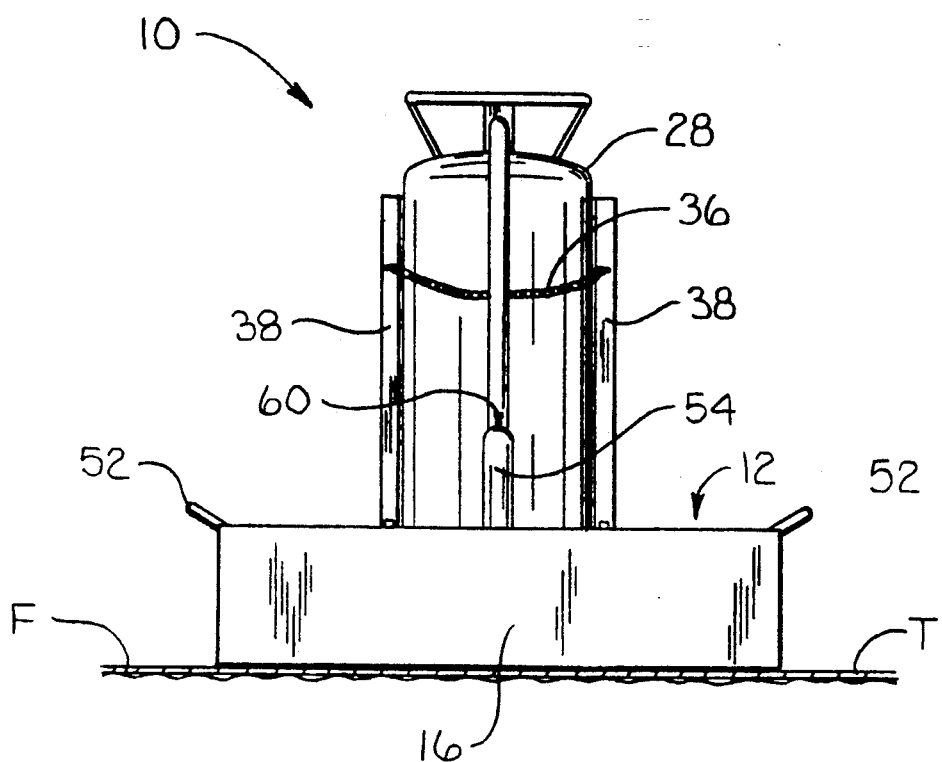
FIG. 3 is a front elevation of apparatus viewed from the containment means side of the apparatus.

As shown in FIGS. 1 and 3, a tank 28 carrying the liquid nitrogen is supported on a platform 30 of a cart, indicated generally at 32. A cage (indicated in its entirety by the reference numeral 34) extends upwardly from the platform and surrounds the tank 28. The front of the cage 34 is open to permit placement of the tank 28 onto the platform 30. A chain 36 may be connected between forward upright members 38 of the cage 34 to close the open front of the cage. The chain 36 is releasably attached at least at one end to one of the upright members 38 so that it may be removed for inserting a tank 28 onto (or removing it from) the cart 32. The cart 32 has front wheels 40 mounted on the platform 30 and a rear caster wheel 42 pivotably mounted on a strut 44 extending rearwardly of the platform. A handle 46 is mounted on the rear caster wheel 42 for pivoting motion with the wheel. The handle 46 is also mounted for pivoting about a horizontal axis between an upright stowed position (shown in phantom in FIG. 1) and a use position (shown in solid in FIG. 1).

The enclosure 12 has a pair of rigid loops 48 mounted at transversely spaced locations on its rear wall 16 for releasably attaching the enclosure to the cart. The loops 48 are adapted to be received on forks 50 mounted on respective upright members 38 of the cage 34. The forks 50 are each mounted by bolts 51 on the upright members 38. There are a plurality of vertically spaced openings (not shown) on the upright members 38 for receiving the bolts so that the height of the forks 50, and thus the spacing of the enclosure 12 from the floor F can be adjusted. However, in the preferred embodiment, the enclosure 12 rests on and slides over the tile T on the floor. The enclosure 12 is moved by pushing or pulling the cart 32 using the handle 46 and steered by pivoting the rear caster wheel 42. To remove the enclosure 12 from the cart 32, the enclosure is lifted upwardly at its rear end until the loops 48 clear the upper ends of the forks 50. Grips 52 on the sides of the enclosure 12 facilitate lifting and moving the enclosure when not in use. In the illustrated embodiment, the cart 32 constitutes "means for moving the containment means". However, it is to be understood that the enclosure may be moved by other means and still fall within the scope of the present invention. For instance, a handle (not shown) could be attached directly to the enclosure 12. The cart 32 would not be necessary where dry ice alone was the cryogen.

Figure 2:
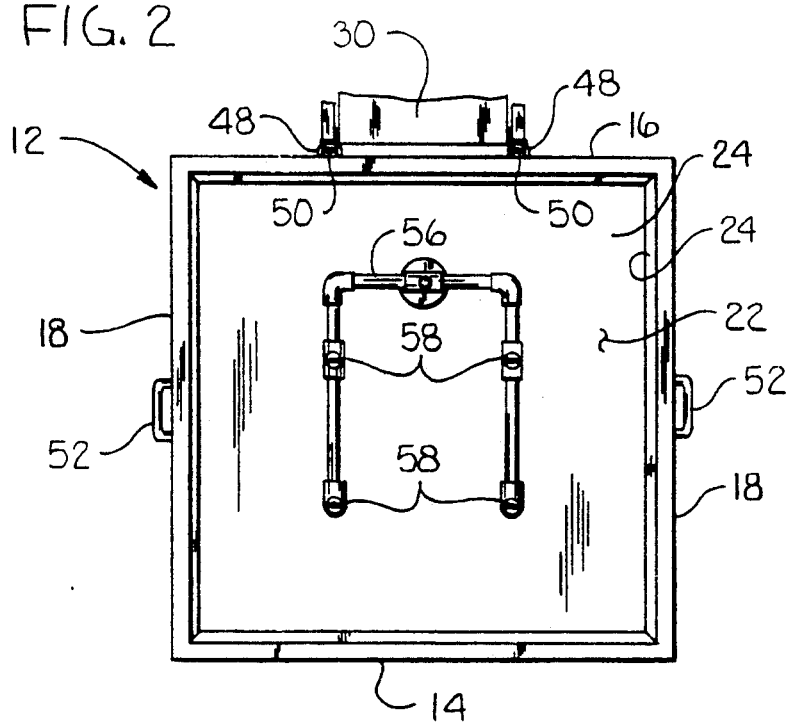
FIG. 2 is a bottom plan of insulated containment means of the apparatus.

Liquid nitrogen is delivered from the tank 28 to the enclosure 12 through an insulated conduit 54. As shown in FIGS. 2 and 4, the conduit 54 feeds a manifold 56 mounted on the top wall 20 of the enclosure 12 and located within the volume enclosed by the enclosure. The manifold 56 is made up of piping, and four nozzles 58 of the manifold are adapted to spray liquid nitrogen in a pattern which covers all of the area of tile T enclosed by the enclosure 12. In the illustrated embodiment, the nozzles 58 are Delavan LF Flat Fan Spray Nozzle Tips manufactured by Cypress Manufacturing Company of East St. Louis, Ill. A valve 60 incorporated into the conduit 54 allows the flow of liquid nitrogen to be quickly and easily shut off during operation of the apparatus. Other valves (not shown) on the tank also control the flow and pressure of the liquid nitrogen in the conventional manner.

Having described the structure of the apparatus 10, its operation in removing floor tiles T will now be explained. If the tiles are made of a hazardous material, such as asbestos, the room where the tiles are located must be sealed and ventilated according to regulations. A typical make-up air system used is the Red Baron Hepa-Vent system available through Global Consumer Services, Inc. of Burbank, Calif. To prepare the apparatus 10 for use, the tank 28 of liquid nitrogen is placed on the platform 30 of the cart 32 through its open front. The chain 36 is connected between the upright members 38 to close the front. The conduit 54 is coupled with the tank 28 for delivering the liquid nitrogen from the tank to the enclosure. Operation begins by selecting an initial area of tile T to be removed. The operator then move the enclosure 12, cart 32 and tank 34 to the selected position by grasping the handle 46 and pushing (or pulling). The enclosure 12 slides across the floor over the tiles, and the cart 32 rolls on its wheels 40, 42. The apparatus is steered by using the handle 46 to pivot the rear caster wheel 42 on its vertical axis.

Once in position, the enclosure 12 encloses a volume generally above the selected area of the floor and tile, with the floor and tile defining the bottom of the volume enclosed. The insulated walls 14-20 of the enclosure greatly retard the transfer of heat from outside the enclosure into the volume, except through the tile. The valve (not shown) on the tank 28 is opened, as is the valve 60 to permit flow of liquid nitrogen from the tank 28 into the manifold 56 and out the nozzles 58. The nozzles 58 spray the liquid nitrogen in a pattern which covers substantially all of the tile T enclosed in the volume. It is believed that admission of the liquid nitrogen into the volume quickly reduces the temperature to something on the order of −300° F. or less, causing the mastic adhering the tile T to the floor F to become embrittled. The enclosure 12 is maintained in position for a predetermined period of time (e.g., 1 minute) to produce the required embrittlement of the mastic. After the time has elapsed, the apparatus 10 is moved (using the handle 46, as before) to expose the area of the tile previously enclosed by the enclosure 12.

In many instances, the thermally induced stresses on the mastic caused by the rapid temperature reduction causes the mastic to break its connection with the floor F and release the title T from the floor. The tiles T may be removed by simply picking them off the floor in one piece. However, if the tiles remain attached to the floor, they may be removed using a long-handled spatula tool (not shown) to wedge between the tile and the floor. The embrittlement of the mastic as uses any remaining bond between the mastic and floor to be quickly broken with a minimal application of force. The tiles usually remain in one piece even when the tool is used, thereby reducing the likelihood of airborne asbestos dust.

When the apparatus 10 is moved from the first selected area, it is typically positioned immediately over an adjacent area where tiles are to be removed. Once in its new position the operation is the same as described above. If some pause in the operation is required, the valve 46 is shut off. If the liquid nitrogen in the tank 34 is used up, or all of the tile has been removed from the floor, the valve (not shown) on the tank is shut off. The tank 28 (if empty) may then be removed from the cart 32 and replaced by another. If the apparatus 10 is to be removed to another room, the enclosure 12 is disconnected from the cart 32 and carried using the grips 52.

As previously stated, other cryogens besides liquid nitrogen may be used with the apparatus of the present invention. Blocks 62 of dry ice may be placed on the floor F under the enclosure 12. The blocks 62 are preferably shaped and arranged in the enclosure 12 so that they cover substantially all of the tile enclosured by the enclosure. As the apparatus is moved across the floor, the blocks 62 engage each other and the front, rear or side wall (14, 16 or 18) of the enclosure 12 opposite the direction of motion, and are pushed along the floor. Liquid nitrogen may be sprayed on to the blocks of dry ice from the nozzles 58. Dry ice may also be used without liquid nitrogen. In that event, the tank 28, cart 32, conduit 54, manifold 56 and nozzles 58 are not required. It is believed that dry ice can reduce the temperature of the mastic to something on the order of −50° F. The enclosure 12 must be maintained in position over an area of tile T for a longer period of time (e.g., 5 minutes) to produce the required embrittlement of the mastic when dry ice is used alone.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method for removing tile adhered by a substance to a floor, the method comprising the steps of:
    enclosing, with an apparatus a volume generally above an area of the floor and tile, the tile and floor defining the bottom of the volume enclosed;
    reducing temperature in the volume enclosed such that the substance adhering the tile to the floor becomes embrittled;
    maintaining the apparatus in position over the area of the floor for a predetermined time to produce the required embrittlement of the adhering substance;
    moving the apparatus to expose the area of the floor previously below the volume enclosed; and
    removing the tile from the floor.

2. A method as set forth in claim 1 wherein the step of maintaining the apparatus in position comprises the step of maintaining the apparatus in position until the substance adhering the tile to the floor breaks its connection with the floor.

3. A method as set forth in claim 1 wherein the step of reducing the temperature comprises the step of introducing cryogen means into the enclosed volume having a temperature of approximately −50° F. or less.

4. A method as set forth in claim 3 wherein said cryogen means introduced is dry ice.

5. A method as set forth in claim 3 wherein the step of reducing the temperature comprises the step of introducing cryogen means into the enclosed volume having a temperature of approximately −300° F. or less.

6. A method as set forth in claim 5 wherein said cryogen means introduced is liquid nitrogen.

7. A method as set forth in claim 5 wherein the step of introducing cryogen means comprises the steps of introducing dry ice into the volume and spraying liquid nitrogen over the dry ice in the volume.

8. A method as set forth in claim 1 wherein the step of enclosing a volume includes the step of insulating the volume against heat transfer except at the bottom wall of the volume.

9. Apparatus for use in removing a tile adhered by a substance to a floor, the apparatus comprising:
    containment means for enclosing a volume above an area of the tile and floor, said containment means comprising a top wall, spaced apart front and rear walls, spaced apart side walls and an open bottom, the floor and tile defining a bottom wall of the volume enclosed;
    cryogen means adapted to be disposed in the volume for absorbing heat from the substance adhering the tile to the floor, said cryogen means being capable of absorbing sufficient heat to embrittle the adhering substance;
    means for moving the containment means away from the area of the floor and tile enclosed for exposing the area and allow removal of the tile in that area from the floor.

10. Apparatus as set forth in claim 9 wherein said cryogen means comprises dry ice enclosed by said containment means.

11. Apparatus as set forth in claim 10 wherein said cryogen means further comprises liquid nitrogen applied over the dry ice.

12. Apparatus as set forth in claim 11 further comprising means for delivering the liquid nitrogen to said containment means, said delivering means comprising a container for storing liquid nitrogen, a conduit extending from the container to said containment means and nozzle means disposed in the volume enclosed by said containment means, said nozzle means being constructed for spraying the liquid nitrogen in a pattern which covers substantially all of the area of the tile and floor at the bottom of the volume enclosed by said containment means.

13. Apparatus as set forth in claim 12 further comprising means for transporting the liquid nitrogen container, said transporting means comprising a cart having wheels and a platform for supporting the container, the cart being connected to said containment means for movement therewith.

14. Apparatus as set forth in claim 9 wherein said moving means comprises handle means and support means attached at one end to said containment means and extending generally upwardly and rearwardly therefrom, said handle means being mounted on said support means generally at the distal end thereof.

15. Apparatus as set forth in claim 14 wherein said containment means further comprises means for insulating the top, front, rear and side walls thereof.

16. Apparatus as set forth in claim 9 wherein said cryogen means comprises liquid nitrogen.

17. Apparatus as set forth in claim 16 further comprising means for delivering the liquid nitrogen to said containment means.

18. Apparatus as set forth in claim 17 wherein said delivering means comprises a container for storing liquid nitrogen, a conduit extending from the container to said containment means and nozzle means disposed in the volume enclosed by said containment means and above the floor, said nozzle means being constructed for spraying the liquid nitrogen in a pattern which covers substantially all of the area at the bottom of the volume enclosed by said containment means.

19. Apparatus as set forth in claim 18 further comprising means for transporting the liquid nitrogen container, said transporting means comprising a cart having wheels and a platform for supporting the container, the cart being connected to said containment means for movement therewith.

* * * * *